United States Patent [19]
Doyle

[11] Patent Number: 5,079,055
[45] Date of Patent: Jan. 7, 1992

[54] REINFORCEMENT FOR LAMINATE SYNTHETIC MATERIALS

[76] Inventor: Brian P. Doyle, 36 High Park Blvd. Floor 3, Toronto, Ontario, Canada M6R 1M8

[21] Appl. No.: 410,411

[22] Filed: Sep. 21, 1989

[51] Int. Cl.[5] .............................. B32B 1/08; B32B 3/10
[52] U.S. Cl. ........................ 428/36.2; 428/36.3; 428/64; 428/65; 428/108; 428/110; 428/111; 428/109; 428/137; 411/427; 411/511; 411/908
[58] Field of Search ............... 428/110, 111, 109, 107, 428/105, 65, 64, 36.2, 36.3, 137, 108, 113; 411/908, 427, 511

[56] References Cited

U.S. PATENT DOCUMENTS

| | | | |
|---|---|---|---|
| 2,025,039 | 12/1935 | Cannon | 428/65 |
| 4,063,838 | 12/1977 | Michael | 411/908 |
| 4,446,185 | 5/1984 | Waragai et al. | 411/908 |
| 4,495,231 | 1/1985 | Laskaris et al. | 428/107 |
| 4,515,847 | 5/1985 | Taverna et al. | 428/107 |
| 4,786,541 | 11/1988 | Nishimura et al. | 428/113 |

FOREIGN PATENT DOCUMENTS 3081035  4/1988  Japan ................................. 428/113

Primary Examiner—Alexander S. Thomas

[57] ABSTRACT

A reinforcement member for a plastic laminate structure consisting of at least two laminate layers bonded to one another, the member having a synthetic body defining a length axis X, a breadth axis Y, and a thickness axis Z, formed of a synthetic plastic material, the length and breadth axes X and Y lying in a first plane, and the thickness axis Z lying in a second plane normal to the first plane, a plurality of first reinforcement fibres lying parallel to the first plane, and, a plurality of second recruitment fibres lying parallel to the second plane.

15 Claims, 3 Drawing Sheets

REINFORCEMENT FOR LAMINATE SYNTHETIC MATERIALS

The invention relates to plastic laiminates and, in particular, to a reinforcement body adapted to be incorporated in such laminates.

BACKGROUND OF THE INVENTION

Synthetic plastic laminates, particularly such as glass fibre reinforced resin laminate, are in wide, use, and are popular for their features of moldability, appearance, weather resistance, strength, and light weight. It is well known, however, that such laminates require special care in the attachment of any fastening devices such as bolts, rivets, and the like. If, for example, it is attempted to secure an article to such a laminate by simply drilling a hole through the laminate and bolting the article to the laminate, it is well known that stress is applied by the bolt to the laminate, and the laminate will sooner or later break down around the hole, and the bolt will become detached from the laminate.

The reason is that while the glass fibres have excellent properties in resisting stresses applied along their length, they have very little capacity for resisting stresses applied transversely. The forces applied by the bolt or other fastening devices may , in same cases, simply be compressive forces, and may also apply forces resulting from the attachment of some article by means of the bolt to the laminate, and it is these forces which cause the laminate to break down around the location of the hole.

In order to overcome this problem, it has been the practice in the past to attempt to increase the thickness of the laminate inthe region where the article is to be bolted. This may be done by simply increasing the layers of laminate in that area. This procedure is somewhat time consuming and troublesome, and while the increased thickness of the layers of laminate may somewhat prolong the life of the laminate, the basic problem still exists, namely that the glass fibres have very little capacity for resisting stresses applied transversely to their length.

Alternatively, the laminate may incorporate some piece of material, in the region where the hole is to be drilled. Such material is usually selected from materials such as metal, wood, and the like, so as to withstand the local stresses imposed by the bolt. This solution is not, however, free from problems. The bond between the laminate and the reinforcement is simply an adhesive bond, and is likely to sooner or later break down with the result that the reinforcement becomes loose within the laminate. It then no longer acts as a reinforcement, and the laminate will soon be damaged by the bolt.

BRIEF SUMMARY OF THE INVENTION

With a view to solving the various problems outlined above, the invention comprises a reinforcement for a plastic laminate structure, said plastic laminate structure being formed of a predetermined synthetic plastic material, and consisting of at least two laminate layers, bonded to one another, said reinforcement member comprising: a synthetic body defining length, breadth and thickness, said body being formed of a synthetic plastic material compatible with said synthetic plastic material of said laminates, said length and breadth dimensions lying in a first plane, and said thickness dimension lying in a second plane normal to said first plane; a plurality of first reinforcement fibres lying in said first plane, and, a plurality of second reinforcement fibres lying parallel to said second plane and normal to said first plane whereby said reinforcement member is adapted to be bonded between said laminate layres of said structure, and whereby said plurality of second reinforcement fibres is adapted to withstand axial stresses parallel to said second plane, while said plurality of first reinforcement fibres is adapted to distribute stresses in said first plane, throughout said laminate structure bonded thereto.

More particularly, it is an objective of the invention to provide a reinforcement member having the foregoing advantages, wherein said laminate structure is formed of glass fibre reinforced resin, and wherein said reinforcement member is formed of glass fibre reinforced resin.

More particularly, it is an objective of the invention to provide a reinforcement member having the foregoing adavantages, wherein said reinforcement member is of generally flattened frusto-conical shape defining a cone axis, and wherein said plurality of first reinforcement fibres lie in a plane transverse to said cone axis, and wherein said plurality of second reinforcement fibres lie along axes parallel to said cone axis, and including openings means formed along said cone axis to receive securement means therein.

More particularly, it is an objective of the invention to provide a reinforcement member having the foregoing advantages and wherein said plurality of first reinforcement fibres are arranged in a generally circular manner.

More particularly, it is an objective of the invention to provide a reinforcement member haivng the foregoing advantages wherein said plurality of first reinforcement fibres are arranged iri a spiral wound fashion.

The various features of novelty which characterize the invention are pointed out with more particularity in the claims annexed to and forming a part of this disclosure. For a better understanding of the invention. its operating advantages and specific objects attained by its use, reference should be had to the accompanying drawings and descriptive matter in which there are illustrated and described preferred embodiments of the invention.

IN THE DRAWINGS

DESCRIPTION OF A SPECIFIC EMBODIMENT

Figure 1:
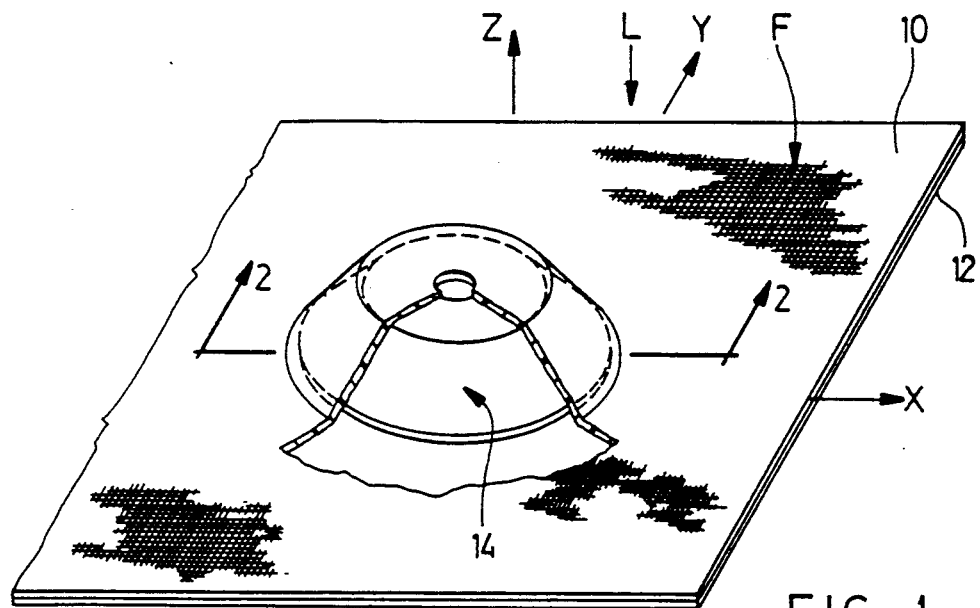
FIG. 1 is a perspective illustration of a portion of a laminate structure showing a reinforcement member in accordance with the invention located between two laminate layers, one of the laminate layers being cut away for clarity.

Referring first of all to FIG. 1, it will be seen that what is there illustrated in schematic form is a portion of a laminate structure indicated as L consisting of first and second laminates 10 and 12, bonded together in known manner. Typically, such laminates 10 and 12 will be glass fibre reinforced resin laminates. However, it will be understood that the invention is not to be taken as limited specifically to such glass fibre reinforced laminates but is of application to a variety of laminate structures of different materials, requiring reinforcement.

In this embodiment of the invention, the reinforcement member is indicated generally as 14, and is shown in more detail in FIGS. 2, 3, 4 and 5.

The reinforcement member 14, in this particular embodiment, defines a body of generally flattened generally fursto-conical shape having first planar surface 16, and a second cone surface 18, and a flattened end surface 20. It will, of course, be appreciated however that the reinforcement member could be of other shape for various applications.

For the purposes of this description, the laminates 10 and 12 will be understood to incorporate, in a well known, manner, reinforcement fibres in this case of glass fibre material indicated generally as F in FIG. 1, which extend throughout each of the laminate layers, lying along axes indicated as X and Y in FIG. 1. Usually such fibres are woven together in some fashion to form a mat or fabric. The fibres F are indicated in phantom schematically, and it will be understood that there are in fact many thousands of such glass fibres in a typical portion of mat. The formation and use of such glass fibre mats is very well known in the art and requires no further description. The purpose of this explanation is merely to indicate that the fibres lie on the X axis and the Y axis of the laminate in a generally common plane or between parallel planes and intersect one another at right angles. The nature of the fibres is that they offer great strength and resistance to stresses applied along the X-Y axes of the laminates, and, provided they are not severed, they will preform effectively over a satisfactory working life. However, once the fibres are severed, for example, to make a hole to receive a fastening device, then they lose their integrity, and no longer perform in the desired manner. In addition, since the fastening device, usually a bolt or rivet, passed through the hole, will apply stresses normal to the X-Y axes, i.e., along the Z axis as shown in FIG. 1, the glass fibres are inherently incapable to offering any substantial resistance to such stresses and the laminate will rapidly fail.

Figure 2:
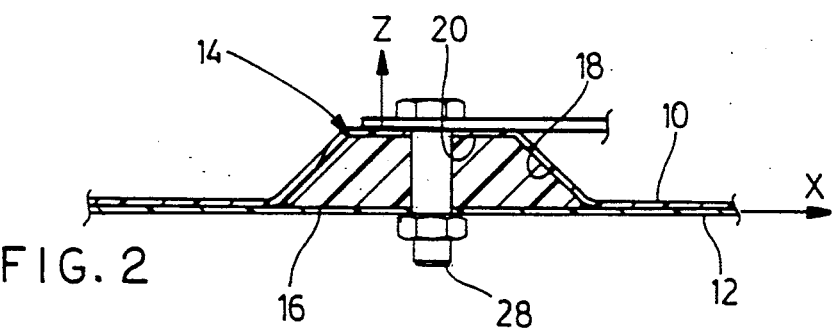
FIG. 2 is a section along line 2—2 of FIG. 1.

In order to overcome these problems, the reinforcement member 14 in accordance with the invention is provided with properties different from those of the laminates 10 and 12 in the manner described below. Again, for the purposes of this explanation, the reinforcement member is considered as having an X axis, a Y axis, and a Z axis as illustrated in FIGS. 2, 3, 4, and 5. It will be appreciated that since the reinforcement member is of generally annular shape in the X-Y axes plane, that the particular location of the arrows X and Y in FIG. 2 is simply for the sake of explanation and without specifically defining those axes. It will, of course, be appreciated however that the X and Y axes wherever they are considered as being located, will be regarded as normal to one another, and the Z axis is normal to both the X and the Y axes, and lies, in this particular embodiment of the invention, along the cone axis.

In accordance with the invention, the reinforcement member or button 14 is made of glass fibre refinforced resin compatible with the glass fibre reinforced resin of the laminate 10 and 12. In this way, a chemical bond is obtained between the reinforcement members and the two laminates, so that once laminated, the structure in the region of the reinforcement member in an integral one-piece homogeneous structure. This is to be distinguished from reinforcements formed of other materials such as wood, metal and the like, wherein whatever bond is achieved between the laminates and the reinforcement member is simply an adhesive bond which, in the majority of cases, will sooner or later fail and cause problems.

In order to give the body 14 specific engineering properties different from those of the laminates 10 and 12, the body 14 is provided with a plurality of first reinforcing glass fibres indicated as 22, lying in the plane of the X-Y axes, or between parallel planes, thus lying transverse to the cone axis or Z axis of the body. In accordance with the invention, these first fibres 22 are preferably arranged in what may be called a generally circular manner, and are preferable spiral-wound for ease of manufacture, the term generally circular being intended to encompass spiral-winding as well as other shapes such as annular.

Figure 3:
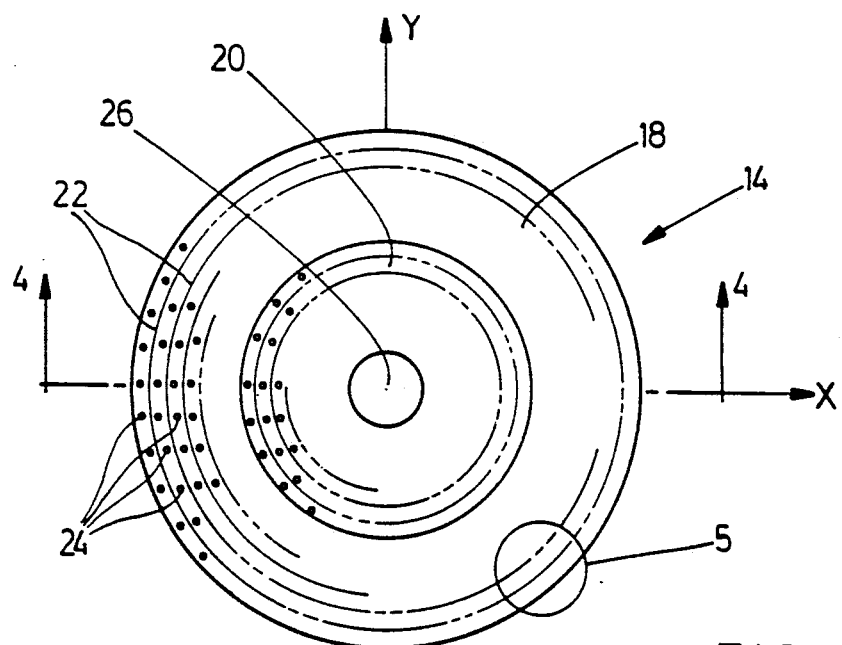
FIG. 3 is a top plan view of the reinforcement member of FIG. 1.
Figure 4:
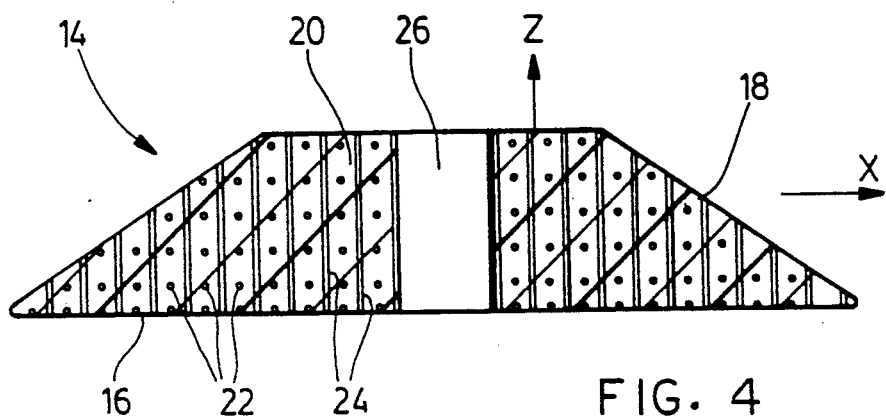
FIG. 4 is a sectional side elevation along the line 4—4 of FIG. 3.
Figure 5:
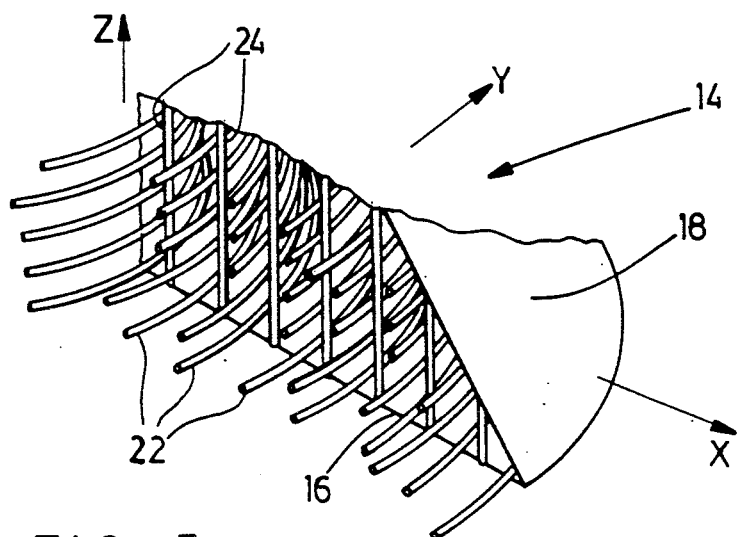
FIG. 5 is a greatly enlarged cut-away detail of the reinforcement member in the region of the circle 5 of FIG. 3.

As best shown in FIGS. 3 and 4, a plurality of second reinforcing glass fibres 24 are arranged to lie along axes parallel to the Z axis, and are generally intertwined or interwoven with the plurality of first reinforcement fibres 22. The body is formed into a homogeneous mass by a suitable quantity of resin material, typically being an epoxy resin, compatible with the resin material of the laminate layers 10 and 12.

For the purposes of illustration, the reinforcement member 14 is shown with a hole or passageway 26 formed therethrough along the cone axis or Z axis of body. It will, of course, be appreciated that in practice the bodies 14 may be formed as solid bodies, or may be formed around a core member (not shown) which can then be withdrawn, leaving the hole 26 in place. Alternatively, if manufactured as solid bodies, without the hole, then once they are incorporated in the laminate structure L, holes can then be drilled out as required.

In the manufacturing of a laminate structure L, the desired location for the reinforcement members 14 will, of course, be predetermined by the design of whatever structure is being built. The reinforcement members will thus be located, for example, with the planar surface 16 on the laminate layer 12. The laminate layer 10 is then applied over the top, with suitable quantities of resin applied in well known manner. Various laminate-forming techaniques may be applied to ensure that the laminate layer 10 shapes and conforms to the cone surface 18 of the body 14.

Once the laminate structure has cured, the two layers 10 and 12 and the members 14 are chemically bonded together and from a solid homogeneous integral structure.

If the members 14 are preformed with holes 26 therin, then the two laminate layers 10 and 12 will simply be drilled out in registration with the holes 26. Alternatively, holes 26 can simply be drilled straight through both laminate layers and the members 14.

Once such holes have been formed, then any form of fastening means such as a bolt or rivet, or a rod of a component, all hereinafter generically referred to as securement means, may be passed through the hole 26. Such securement menas are indicated in phantom, generally as 28.

Stresses imposed by a load on such a securement means will usually lie along the Z axis. Such stresses will be resisted by the second Z axis fibres 24, and will be distributed through the first X-Y axes fibres 22 to the regions of the laminate layers 10 and 12 overlying and surounding the reinforcement member 14.

In this way, the load imposed by each securement means is effectively resisted, and is distributed, without damage to the laminate layers 10 and 12.

Figure 6:
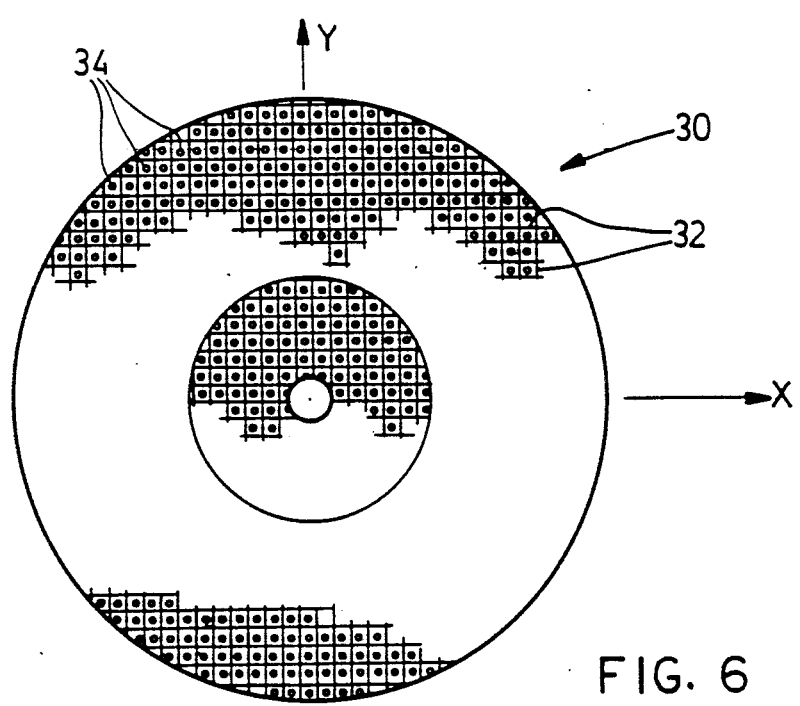
FIG. 6 is a top plan view of an alternate embodiment of reinforcement member.

In accordance with a further embodiment of the invention as illustrated in FIG. 6, a somewhat simpler although not quite so effective form of reinforcement member 30 may be provided. In this embodiment, a plurality of first fibres 32 are essentially woven fibres lying in the X-Y axes plane. Such interwoven fibres do not have quite the same capacity for resisting stresses and distributing stresses to the laminates 10 and 12 as do generally circular or spiral-wound reinforcement fibres, but will be somewhat less complicated and, therefore, less expensive to make. In many applications where extreme stresses are not encountered, such reinforcement members 30 may be satisfactory. The plurality of second Z axis fibres 34 are distributed and located normal to the plane of the X-Y axes fibres, as before.

Figure 7:
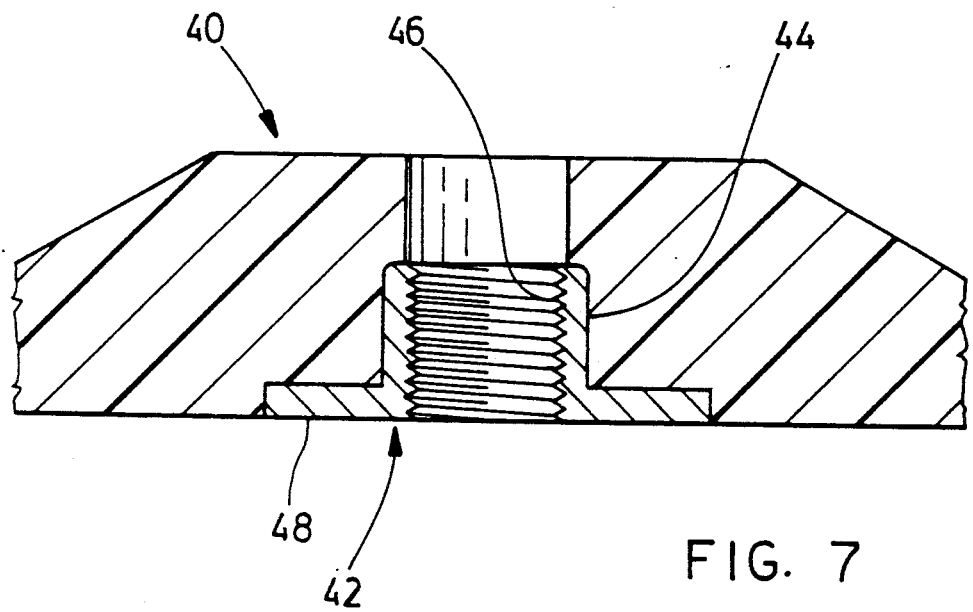
FIG. 7 is a side elevational view of an alternate embodiment of reinforcement member, and, FIG. 8 is a sectional illustration of a further alternate embodiment.
Figure 8:
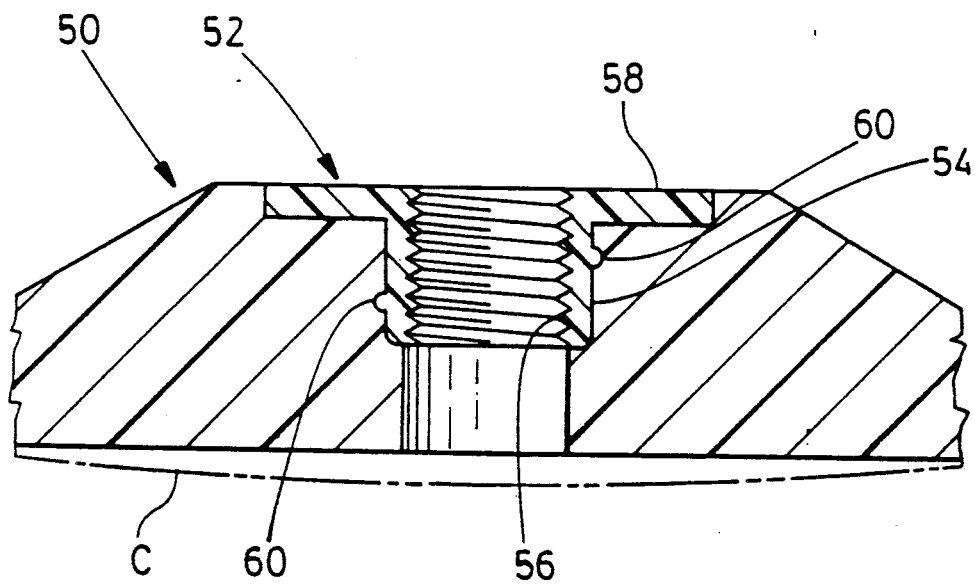

It will, of course, be appreciated that various modifications and adaptations of the invention may be made for specific purposes. Two possible modifications are shown in FIGS. 7 and 8. In the embodiment of FIG. 7, a button or reinforcement member 40 is indicated having the same properties and features as the embodiment of FIGS. 2 to 5, or the embodiment of FIG. 6, but in this case it further incorporates an insert member indicated generally as 42. The insert member 42 in this embodiment consists of a generally cylindrical sleeve portion 44 threaded as at 46. A flange or skirt portion 48 may extend outwardly from one end of the cylindrical portion 44. The insert member 42 would normally be incorporated in the body 40 during manufacture, and would typically provide a means for receiving an article, for example, a threaded festening (not shown).

In this embodiment the flange or skirt portion 48 is shown incorporated co-planar with the larger flat surface of the body 40, and would thus lie flat on one of the laminates.

The embodiment illustrated in FIG. 8 incorporates a button or reinforcement member 50 having an insert 52 with a cylindrical sleeve portion 54 threaded as at 56 if desired.

An annular flange or skirt portion 58 is incorporated, in this case lying in the smaller planar side of the reinforcement member 50. In this embodiment, locking formations 60 may be provided on the exterior of the sleeve portion 54 for keying the insert portion within the body 50.

In either of the embodiments of FIGS. 7 or 8, the insert portions could be formed of metal, or could be, for example, injection moulded synthetic plastic materials having appropriate properties, or any other suitable material.

It will, of course, be appreciated that while the reinforcement members in the various embodiments are illustrated as having generally planar under and upper surfaces, they could also be provided with contoured or shaped surfaces adapted to conform to the shape of these articles for which the laminate structure was being fabricated. For example, if the laminates were in fact forming a curved portion of, for example the hull of a boat, then it might be desirable to fabricate the reinforcement members or buttons with curvature, corresponding to the curvature in the particular location of the boat hull. Such curvature is indicated generally in FIG. 8 by the phantom line C.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A reinforcement member for use in a plastic laminate structure, said plastic laminate structure being formed at least in part of a predetermined synthetic plastic material, and consisting of at least two laminate layers, bonded to one another, said reinforcement member comprising:

a synthetic body defining a length axis X, a breadth axis Y, and a thickness axis Z, said body being formed at least in part of a synthetic plastic material compatible with said synthetic plastic material of said laminates, said length and breadth axes X and Y lying at right angles to one another in a first plane, and said thickness axis Z lying normal to said first plane and located in a second plane;

a plurality of first reinforcement fibres lying parallel to said X axis in said first plane;

a plurality of second reinforcement fibres lying parallel to said Y axis in said first plane, said first and second fibres intersecting one another at right angles;

a plurality of third reinforcement fibres lying parallel to said Z axis in said second plane normal to said first plane, said plurality of third reinforcement fibres intersecting both said first and said second reinforcement fibres at right angles whereby said reinforcement member is adapted to be bonded between said laminate layers with said first plane being substantially parallel with said laminate layers and said second plane lying transversely thereto, and said plurality of third reinforcement fibres is adapted to withstand axial stresses parallel to said second plane, while said pluralities of first and second reinforcement fibres are adapted to distribute stresses in said first plane, and said reinforcement member being of generally flattened frustoconical shape defining a cone axis, and wherein said pluralities of first and second reinforcement fibres lie in a plane transverse to said cone axis, and wherein said plurality of third reinforcement fibres lie along axes parallel to said cone axis, and, opening means formed along said cone axis to receive securement means therein.

2. A reinforcement member as claimed in claim 1, wherein said laminate layers are formed of fibre reinforced resin, and wherein said reinforcement member is formed of fibre reinforced resin.

3. A reinforcement member as claimed in claim 1 including an insert portion embedded in said reinforcement member.

4. A reinforcement member as claimed in claim 3, wherein said insert portion is of generally cylindrical shape and defines a threaded interior.

5. A reinforcement member as claimed in claim 4 including a flange portion formed around one end of said 6. A reinforcement member as claimed in claim 1 including opening means formed through said synthetic body along said Z axis.

7. A reinforcement member as claimed in claim 1, wherein said first plurality of reinforcement fibres is arranged in a generally circular manner.

8. A reinforcement member as claimed in claim 1, wherein said first plurality of reinforcement fibres is arranged in a spiral wound fashion.

9. A plastic laminate structure incorporating a reinforcement member said plastic laminate structure being formed at least in part of a predetermined synthetic plastic material, and comprising;

at least two laminate layers, bonded to one another;

a synthetic reinforcement body member between said laminate layers defining a length axis X, a breadth axis Y, and a thickness axis Z, said body being formed at least in part of a synthetic plastic material compatible with said synthetic plastic material of said laminate layers, said length and breadth axes X and Y lying in a first plane, and said thickness axis Z lying in a second plane normal to said first plane;

a first plurality of reinforcement fibres lying parallel to said first plane, and, a second plurality of reinforcement fibres lying parallel to said Z axis in said second plane normal to said first plane, said reinforcement member being bonded between said laminate layers with said first plane being substantially parallel with said laminate layers and said second plane lying transversely thereto, and said second plurality of reinforcement fibres being operative to withstand axial stresses parallel to said second plane, while said first plurality of reinforcement fibres is adapted to distribute stresses in said first plane, throughout said laminate structure.

10. A plastic laminate structure as claimed in claim 9, wherein said laminate layers are formed of fibre reinforced resin, and wherein said reinforcement member is formed of fibre reinforced resin.

11. A plastic laminate structure as claimed in claim 9, wherein said reinforcement member is of generally flattened frusto-conical shape defining a cone axis, and wherein said first plurality of reinforcement fibres lie in a plane transverse to said cone axis, and wherein said second plurality of reinforcement fibres lie along axes parallel to said cone axis, and including opening means formed along said cone axis to receive securement means therein.

12. A plastic laminate structure as claimed in claim 11, wherein said reinforcement member has upper and under surfaces spaced apart from one another along said Z axis, and wherein said upper and under surfaces are planar and lie in parallel planes.

13. a plastic laminate structure as claimed in claim 12 including an insert portion embedded in said reinforcement member, of generally cylindrical shape and defining a threaded interior.

14. A plastic laminate structure as claimed in claim 9, wherein said first plurality of reinforcement fibres is arranged in a generally circular manner.

15. A plastic laminate structure as claimed in claim 9, wherein said first plurality of reinforcement fibres is arranged in a spiral wound fashion.

* * * * *